(12) United States Patent
Ram et al.

(10) Patent No.: US 10,020,951 B2
(45) Date of Patent: Jul. 10, 2018

(54) CROWDSOURCING-BASED DETECTION, IDENTIFICATION, AND TRACKING OF ELECTRONIC DEVICES

(71) Applicant: CA, INC., Islandia, NY (US)

(72) Inventors: Jaimini Ram, Bangalore (IN); Rajeev Tewari, Haldwani (IN); Bharath Nagaraj Rao, Mysore (IN)

(73) Assignee: CA, INC., Islandia, NY (US)

( * ) Notice: Subject to any disclaimer, the term of this patent is extended or adjusted under 35 U.S.C. 154(b) by 507 days.

(21) Appl. No.: 14/489,016

(22) Filed: Sep. 17, 2014

(65) Prior Publication Data

US 2016/0080486 A1    Mar. 17, 2016

(51) Int. Cl.
| | | |
|---|---|---|
| G06F 15/16 | (2006.01) | |
| H04L 12/18 | (2006.01) | |
| H04L 12/58 | (2006.01) | |
| H04W 4/02 | (2018.01) | |

(52) U.S. Cl.
CPC ........ *H04L 12/1822* (2013.01); *H04L 51/046* (2013.01); *H04W 4/023* (2013.01)

(58) Field of Classification Search
CPC ..... H04L 12/1822; H04L 51/046; H04W 4/02
USPC ........................................................ 709/205
See application file for complete search history.

(56) References Cited

U.S. PATENT DOCUMENTS

| | | | | |
|---|---|---|---|---|
| 2003/0095522 A1* | 5/2003 | Korus | ..................... | H04L 12/18 370/338 |
| 2006/0041931 A1* | 2/2006 | Boxall | ................... | H04L 41/082 726/4 |
| 2009/0037213 A1 | 2/2009 | Eisen | | |
| 2010/0061294 A1* | 3/2010 | Proctor, Jr. | ........ | G06Q 30/0623 370/328 |
| 2011/0007901 A1* | 1/2011 | Ikeda | ....................... | H04B 5/02 380/270 |
| 2011/0099480 A1 | 4/2011 | Sama et al. | | |
| 2011/0312278 A1* | 12/2011 | Matsushita | ....... | H04L 12/40013 455/66.1 |
| 2013/0080616 A1* | 3/2013 | Tsui | ..................... | H02J 7/0055 709/223 |
| 2014/0171097 A1* | 6/2014 | Fischer | .................. | H04W 4/02 455/456.1 |
| 2014/0274136 A1* | 9/2014 | Edge | ...................... | H04W 4/04 455/456.2 |

(Continued)

OTHER PUBLICATIONS

Kotanen et al., "Experiments on Local Positioning with Bluetooth", Proceedings of the International Conference on Information Technology: Computers and Communications (ITCC'03), Copyright © 2003 IEEE, 7 pages.

(Continued)

*Primary Examiner* — Sm Rahman
(74) *Attorney, Agent, or Firm* — Sage Patent Group

(57) ABSTRACT

In a method of detecting electronic devices, information about a first user equipment device is received at a server. The information is received from at least one second user equipment device within range of a wireless communication interface of the first user equipment device. A presence of the first user equipment device is detected at the server based on the information received from the at least one second user equipment device. The receiving and the detecting may be operations performed by at least one processor of the server. Related apparatus and computer program products are also discussed.

18 Claims, 7 Drawing Sheets

(56) References Cited

U.S. PATENT DOCUMENTS

2015/0304815 A1* 10/2015 Ghose ............... H04W 4/023
455/456.3

OTHER PUBLICATIONS

Chatzimilioudis et al., "Crowdsourcing with Smartphones", University of Cyprus, Dept. of Computer Science, Copyright@2012, 7 pages.

* cited by examiner

CROWDSOURCING-BASED DETECTION, IDENTIFICATION, AND TRACKING OF ELECTRONIC DEVICES

BACKGROUND

Various embodiments described herein relate to electronic devices, and more particularly, to detection of electronic devices.

With the exponential explosion of consumer electronic devices, particularly network and internet-linked devices (such as laptops, mobiles, tablets) and other special purpose devices (such as those related to Internet of Things (IoT)), there may be greater demand for detection and tracking these devices. For example, device tracking and identification may be used to ensure that the devices are used for the intended transactions and/or to protect against unauthorized transactions, such as transactions initiated by stolen devices.

Several techniques have been proposed for device identification. One such technique can employ the difference between the time at a device used for a transaction and the time at the server to identify the device. Another technique can leverage manufacturing variations, which may cause differences in CPU clock speed etc., to identify devices.

However, with such techniques for device detection and tracking, there may also be a greater awareness of privacy related issues. For example, some techniques can perform "geo-fencing" based on a current location of a device, as obtained from Global Positioning Systems (GPS); however, such techniques typically require specific user permissions. Other techniques may utilize detection of indoor device positioning, for example, using one or more mobile phones, beacons, and/or PCs, but may likewise require user permissions to function.

SUMMARY

According to some embodiments described herein, in a method of detecting electronic devices, information about a first user equipment device is received at a server. The information is received from at least one second user equipment device within range of a wireless communication interface of the first user equipment device, and is authorizable by the first user equipment device. A presence, identity, and/or proximity of the first user equipment device relative to the at least one second user equipment device is detected at the server based on the information received from the at least one second user equipment device. The receiving and the detecting may be operations performed by at least one processor of the server.

In some embodiments, the information about the first user equipment device may be received from the at least one second user equipment device independent of authorization by the first user equipment device.

In some embodiments, the first user equipment device may be identified by the server based on the information received from the at least one second user equipment device. The information may be device identification information that is inaccessible to an application installed on the first user equipment device.

In some embodiments, the device identification information may be address information for the wireless communication interface of the first user equipment device, and the wireless communication interface may be a decentralized communication interface via which the address information is transmitted.

In some embodiments, the address information received at the server may not be originated from a centralized network infrastructure.

In some embodiments, an application identifier for the application installed on the first user equipment device and/or additional information about the first user equipment device may be received via a centralized network infrastructure, and the application identifier and/or additional information may be correlated with the address information received from the at least one second user equipment device to identify the first user equipment device.

In some embodiments, a proximity of the first user equipment device to the second user equipment device may be determined by the server based on the information received therefrom. The information may indicate a received signal strength of the wireless communication interface of the first user equipment device at the second user equipment device.

In some embodiments, a distance between the first user equipment device and the second user equipment device may be determined by the server based on the received signal strength.

In some embodiments, a presence of a trusted electronic device within the proximity may be detected by the server, and a level of trust for the first user equipment device may be determined by the server based on the presence of the trusted electronic device within the proximity.

In some embodiments, the first user equipment device may be authenticated by the server based on the presence of the trusted electronic device within the proximity and independent of authentication information received from the first user equipment device.

In some embodiments, access to a resource by the first user equipment device access may be controlled by the server based on the presence of the trusted electronic device within the proximity.

In some embodiments, a level of risk to a transaction with the first user equipment device may be assigned by the server based on the presence of the trusted electronic device within the proximity.

In some embodiments, the second user equipment device may be one of a plurality of user equipment devices from which respective information about the first user equipment device is received.

In some embodiments, a relative location of the first user equipment device to the second user equipment devices may be determined based on the respective information received from the plurality of user equipment devices.

In some embodiments, the presence of first user equipment device in an unauthorized area may be detected by the server based on the relative location.

In some embodiments, a logical boundary defined by the relative location of the first user equipment device to the at least one second user equipment device may be generated by the server.

In some embodiments, a direction of movement of the first user equipment device may be determined by the server based on changes in the proximity.

In some embodiments, a request to the at least one second user equipment device may be transmitted by the server, and the information about the first user equipment device may be received therefrom responsive to transmitting the request.

According to further embodiments described herein, a computer system includes a processor and a memory coupled to the processor. The memory includes computer readable program code embodied therein that, when executed by the processor, causes the processor to receive information about a first user equipment device that is transmitted from at least one second user equipment device within range of a wireless interface of the first user equipment device, where the information is authorizable by the first user equipment device, and detect a presence, identity, and/or proximity of the first user equipment device relative to the at least one second user equipment device based on the information received from the at least one second user equipment device.

According to still further embodiments described herein, a computer program product includes a computer readable storage medium having computer readable program code embodied in the medium. The computer readable program code includes computer readable code to receive information about a first user equipment device that is transmitted from at least one second user equipment device within range of a wireless interface of the first user equipment device, where the information is authorizable by the first user equipment device, and detect a presence, identity, and/or proximity of the first user equipment device relative to the at least one second user equipment device based on the information received from the at least one second user equipment device.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects described herein are illustrated by way of example and are not limited by the accompanying figures with like references indicating like elements.

DETAILED DESCRIPTION OF EMBODIMENTS

Figure 1:
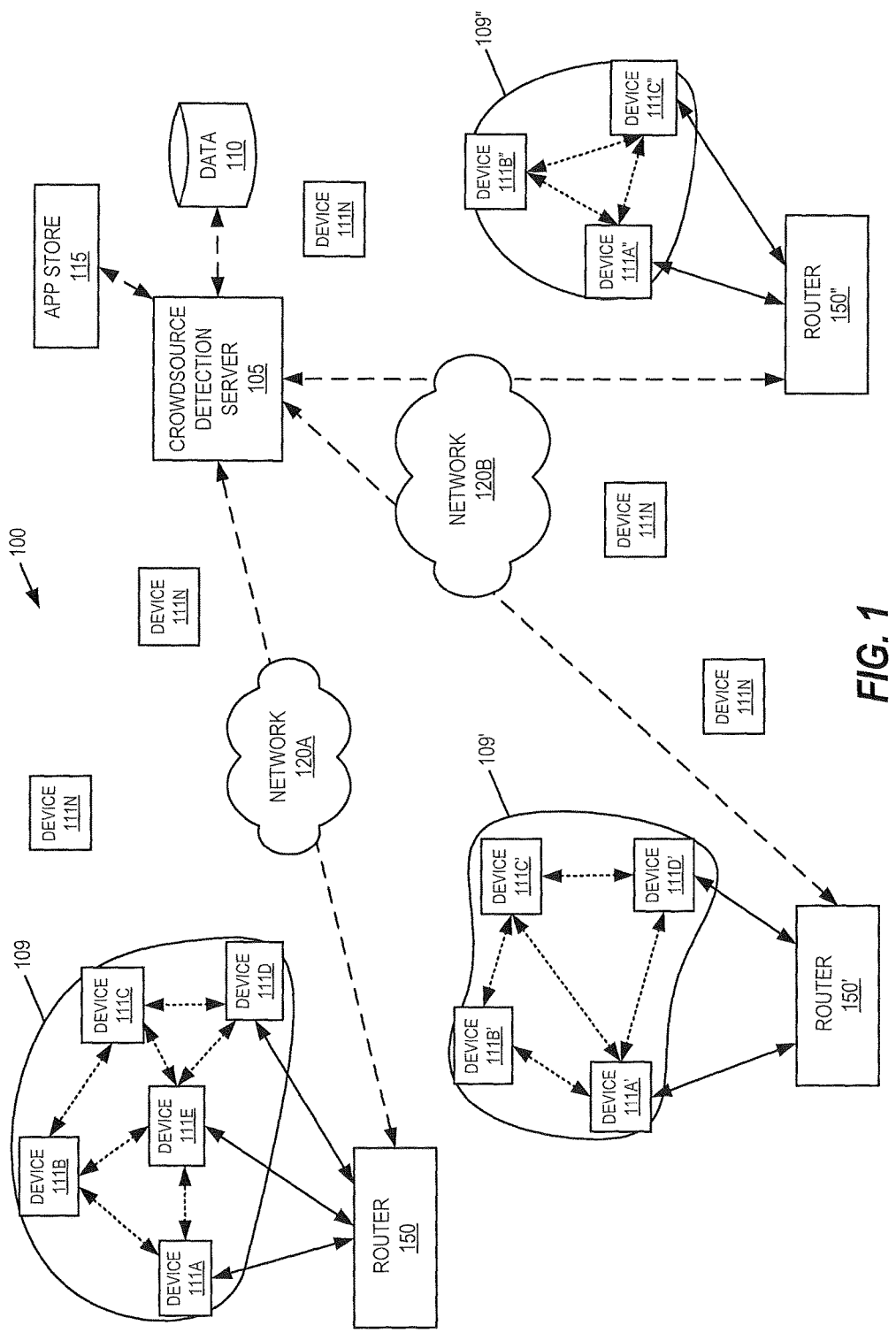
FIG. 1 is a block diagram of a computing system or environment for detecting electronic devices in accordance with embodiments described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, user equipment devices may refer to electronic devices operated or otherwise used by an end-user, including consumer electronic devices. The term "consumer electronic devices" may refer to wireless computing terminals (such as mobile phones, tablets, and laptop computers), wired computing terminals (such as desktop computers and "smart" household appliances), and/or other electronic devices that are discoverable and/or otherwise accessible via a wired or wireless local-area or personal-area network interface, including devices that communicate via other short-range wireless interfaces and/or may be otherwise interconnected in accordance with the Internet-of-Things (IoT). The user equipment devices described herein may be configured to or otherwise capable of authorizing the identification information provided therefrom, in contrast to, for instance, computer peripheral devices, which may not have such capability.

Some embodiments described herein may arise from realization that identification information for a user equipment device (including but not limited to address information) may not be readily accessible to applications (for instance, third-party applications) running on the device itself, particularly without user authorization, but may be readily discoverable or otherwise shared with other proximately-located user equipment devices (for instance, for peer-to-peer communication) via a wireless interface. For example, a mobile phone's media access control (MAC) address may not be accessible to many applications installed and/or running on the mobile phone itself, but the mobile phone may readily share its MAC address with one or more surrounding devices that are within transmission range of its Bluetooth® and/or Wi-Fi™ interface transceiver.

Accordingly, some embodiments described herein rely on indirect discovery of identification information about a user equipment device, based on information that is shared with or otherwise discoverable by other nearby or surrounding devices. Embodiments described herein may collect and utilize such information received from the other nearby devices to detect, identify and/or track the user equipment device, independent of participation by (or permission, authorization, and/or consent from) the user equipment device or a user thereof. In particular, information about a particular user equipment device may be received by one or more other user equipment devices within range of a wireless transceiver of that particular user equipment device, and may be forwarded to a server. The server may thereby detect a presence, identity, and/or relative proximity of the particular user equipment device based on the information received from the other nearby or surrounding user equipment devices, without or independent of receiving such information from the particular device itself and/or from network access points or other network infrastructure.

Embodiments described herein thus approach device detection, identification, and/or tracking from a crowdsourcing perspective, leveraging information received from surrounding devices (i.e., the crowd) to detect, identify, and track a particular device. For example, devices such as laptops, smartphones and/or other special purpose devices may be Bluetooth- and/or Wi-Fi-capable, and may act as a transmitter (as well as a receiver) to provide crowdsourced information. This crowdsourced information may be used for multiple solutions, for example, for authentication, risk evaluation, and/or data access control. In particular, embodiments described herein may allow for peer to peer detection of devices, discovery of MAC interface addresses for the devices (which may not be obtained otherwise), geo-fencing without using device location data, and/or password-less authentication and/or authorization based on the crowdsourced information. Particular embodiments described herein may be used to establish a greater confidence in detecting, identifying and/or tracking devices in an Enterprise Mobility (EM) environment, while further embodiments may be extended internet-wide and/or to the Internet of Things (IOT).

Embodiments described herein may differ from some conventional device identification and/or tracking techniques. For example, as surrounding devices detect and transmit information about each other (rather than about themselves) to a server, embodiments described herein may allow for passive device identification and tracking, independent of user action, permission, and/or authorization. Also, no pairing, networking, or local storage between devices is required, as the devices may simply detect discoverable information about the surrounding devices and forward the detected information on to the server. As such, using the received information, the server may detect presence, identity, and/or proximity of a particular device indirectly, based on its communications with other devices, and independent of information from network infrastructure, access points, and/or beacons transmitted thereby.

FIG. 1 is a block diagram illustrating a computing system or environment 100 for crowdsourcing-based detection of electronic devices in accordance with embodiments described herein. Referring now to FIG. 1, the computing environment 100 includes a plurality of wireless and/or wired user equipment devices 111A-111E, 111A'-111D', 111A"-111C", and 111N. The user equipment devices may be mobile phones, tablets, laptop/desktop computers, smart appliances, and/or other devices (generally referred to herein as consumer electronic devices). The devices 111A-111E, 111A'-111D', 111A"-111C", and 111N include a network transceiver that is configured provide an interface for communication (such as peer-to-peer communication) with each other, and/or with one or more networks 120A, 120B, for example, via network access devices, such as routers 150, 150', 150". At least some of the devices 111A-111E, 111A'-111D', 111A"-111C", and 111N may include a short-range wireless network transceiver that provides a wireless local- or personal-area network communication interface, such as a Wi-Fi, Bluetooth, or near-field communication (NFC) interface.

The networks 120A, 120B may be global networks, such as the Internet or other publicly accessible networks. Various elements of the networks 120A, 120B may be interconnected by a wide area network (WAN), a local area network (LAN), an Intranet, and/or other private network, which may not be accessible by the general public. Thus, the communication networks 120A, 120B may represent a combination of public and private networks or a virtual private network (VPN). The networks 120A, 120B may be a wireless network, a wireline network, or may be a combination of both wireless and wireline networks. Although illustrated as separate networks, it will be understood that the networks 120A, 120B may represent a common network in some embodiments. A such, the devices 111A-111E, 111A'-111D', 111A"-111C", and 111N may communicate with the server 105 by any conventional public and/or private, real and/or virtual wired and/or wireless network including all or a portion of the global communication network known as the Internet.

As shown in FIG. 1, one or more of the devices 111A-111E, 111A'-111D', 111A"-111C", and 111N may be configured to communicate with at least one central crowdsource detection server 105 via the network(s) 120A, 120B. For example, a software application that is configured to communicate with and provide information to the server 105 (for example, via the routers 150, 150', 150") may be installed on the devices 111A-111E, 111A'-111D', and/or 111A"-111C". The software application may, for instance, be downloaded from an application store or other environment for hosting apps (such as app store 115), and may include functionality (in addition to the crowdsourcing functionality described herein) that may be desirable or required by the users of the devices 111A-111E, 111A'-111D', and/or 111A"-111C". For example, the software application may be an enterprise software application (ESA) for an organization, and the users of the devices 111A 111E, 111A'-111D', and/or 111A"-111C" may be employees of the organization.

The information provided to the crowdsource detection server 105 may include device address or other device identification information that is not accessible to the software application installed/executing on the devices 111A-111E, 111A'-111D', 111A"-111C" themselves, but may be discoverable by or otherwise shared with surrounding or proximately-located ones of the devices 111A-111E, 111A'-111D', 111A"-111C" via a local- or personal-area network communication interface, such as a Wi-Fi or Bluetooth interface. For example, the MAC address of device 111B may not be accessible to one or more software applications installed and/or running on device 111B itself, but device 111B may share its MAC address with one or more surrounding devices 111A, 111C, and 111E (which are within communication range of a short-range wireless transceiver of device 111B, as illustrated by the dotted lines in FIG. 1) for peer-to-peer communications. Likewise, devices 111B' and 111B" may share their MAC addresses with proximately located devices 111A'/111C' and 111A"/111C", respectively. The applications executing on the devices 111A, 111C, 111E, 111A', 111C', 111A", and 111C" may thereby transmit the discovered MAC addresses of the devices 111B, 111B', and 111B" to the server 105 via communications with routers 150, 150', and 150", respectively.

In the example discussed above, the devices 111A, 111C, 111E, 111A', 111C', 111A", and 111C" (which provide the crowdsourced information to the server 105) may be referred to as source devices, while the devices 111B, 111B', and 111B" (to which the crowdsourced information received at the server 105 pertains) may be referred to as target devices. However, it will be understood that, in crowdsourcing operations described herein, any of the devices 111A-111E, 111A'-111D', and/or 111A"-111C" may function as source devices and/or target devices, depending on whether the identification information received at the server 105 is transmitted from the devices, or is about the devices.

Thus, in embodiments described herein, the information transmitted from the devices 111A-111E, 111A'-111D', and/or 111A"-111C" to the server 105 is not about (or otherwise does not pertain to) the transmitting device. Rather, each of the devices 111A-111E, 111A'-111D', and/or 111A"-111C" detects and shares information about other ones of the devices 111A-111E, 111A'-111D', and/or 111A"-111C" within range of its respective wireless interface. As such, proximately-located ones of the devices 111A-111E, 111A'-111D', and/or 111A"-111C" may detect and share information about each other with the crowdsource detection server 105, without active participation by (or even authorization from) the users of the devices 111A-111E, 111A'-111D', and/or 111A"-111C". The devices 111A-111E, 111A'-111D', and/or 111A"-111C" may be configured to share information via peer-to-peer, ad-hoc, mesh, or other decentralized or infrastructure-less networking technologies.

Still referring to FIG. 1, the crowdsource detection server 105 is configured to collect and analyze the information received from the devices 111A-111E, 111A'-111D', and/or 111A"-111C", for example, to detect, identify, and/or track these devices. For example, the server can collect and store MAC addresses (and/or other identifying information) for one or more of the devices 111A-111E, 111A'-111D', and/or 111A"-111C" (as received from neighboring ones of the devices 111A-111E, 111A'-111D', and/or 111A"-111C") in a data store or database 110. In some embodiments, the crowdsource detection server 105 may be configured to transmit a crowdsourcing request to the devices 111A-111E, 111A'-111D', and/or 111A"-111C", and may receive the information about neighboring ones of the devices therefrom responsive to the crowdsourcing request. The crowdsource detection server 105 may analyze the collected information in the database 110 to provide various functionality as described herein. For example, the crowdsource detection server 105 may be configured to determine various characteristics of or other information about individual ones of the devices 111A-111E, 111A'-111D', and/or 111A"-111C", including but not limited to presence, identity, proximity, authentication, location, movement, level of trust, and/or level of risk associated therewith, based on the crowdsourced information from the surrounding devices stored in the database 110.

For example, the server 105 may provide the devices 111A-111E, 111A'-111D', and/or 111A"-111C" with protection and/or access to particular software services based on the MAC address or other identification of a device, as determined from the crowdsourced information stored in the database 110. For other devices (such as Apple® devices, where MAC addresses may not be readily discoverable), the server 105 can associate a MAC address with the device based on common characteristics such as UUID, device name, and/or other device signatures etc., which may be determined from other sources. In particular, in an Enterprise use case, geographically distributed Wi-Fi routers 150, 150', 150" may provide additional information about ones of the devices 111A-111E, 111A'-111D', and/or 111A"-111C" in communication therewith (including but not limited to the names of the devices, the Wi-Fi MAC addresses, IP Addresses assigned to the devices, duration of connections, accessed URLs etc). The server 105 may correlate this additional information with the information collected in the database 110 to aid in identification of a specific device. The server 105 may also access information from the Enterprise App store 115, which can provide additional information about interactions between the devices 111A-111E, 111A'-111D', and/or 111A"-111C" and the app store 115 (including but not limited to access times, authentication details, what apps are downloaded and updated, etc.) for correlation by the server 105. The server 105 may also associate a user with one or more of the devices 111A-111E, 111A'-111D', and/or 111A"-111C", for example, based on information (such as an application identifier) provided by the respective applications installed on the devices.

In some embodiments, the server 105 may analyze the crowdsourced information stored in the database 110 to determine the presence and/or proximity of ones of the devices 111A-111E, 111A'-111D', and/or 111A"-111C" relative to one another, even for ones of the devices that do not include an installed software application that is configured to communicate with the server 105. For instance, in an example enterprise environment, a visitor's device (which may not include the software application for communication with the server 105 and/or otherwise may not have been previously 'seen' before by the server) may nevertheless be detected and identified based on the information received from proximately-located ones of the devices 111A-111E, 111A'-111D', and/or 111A"-111C". As such, the server 105 may detect, identify, and/or track ones of the devices 111A-111E, 111A'-111D', and/or 111A"-111C" whether or not such devices are configured to communicate with the server 105, without action, permission, and/or authorization by such devices or users thereof.

In addition, the information received at the server 105 from the devices 111A-111E, 111A'-111D', and/or 111A"-111C" provides multiple, independent verifications of each device from its neighboring devices, based on proximity thereto. As such, the server 105 may determine respective trust levels for the devices 111A-111E, 111A'-111D', and/or 111A"-111C", and may authenticate devices based on the concept of crowdsourced trust. That is, if a device is seen by one or more devices, then the same information about the device received from multiple proximately-located devices can be considered more trustworthy, and may be used for automatic authentication (for example, based on the MAC address, UUID, name of the device, and/or other parameters received from surrounding devices). For example, particular ones of the devices 111A-111E, 111A'-111D', and/or 111A"-111C" may be "known" to or trusted by the server 105, and thus, devices surrounding such known devices (for example, within a 'circle of trust' defined by locations of the trusted devices) may be associated with higher levels of trust based on respective proximities thereto. In particular, some stationary devices (such as desktop or even laptop computers) may be associated with or owned by an enterprise or organization in an office environment, and thus, may be recognized and considered as trusted devices by the server. As such, mobile devices (such as smartphones, which may be carried by employees within the office environment) proximately located to a "known" stationary device may be assigned higher trust levels and/or access to resources based on proximity to a trusted device. For example, the server 105 may allow an unknown/visitor's mobile device certain privileges, for example, access to services and/or available hotspots, based on the detected proximity to trusted ones of the devices 111A-111E, 111A'-111D', and/or 111A"-111C". Conversely, if a known device is not visible to other known devices, the server 105 may authenticate and relax access controls for the known device, even though information about the device may be received over VPN or some other internet hotspot. The server 105 may also perform risk evaluation for transactions based on the detected proximity of a device to other known devices, and/or whether the information provided for the transaction matches the information collected by and forwarded to the server 105 by the respective app.

In some embodiments, the crowdsource detection server 105 can use the relative proximities of the devices 111A-111E, 111A'-111D', and/or 111A"-111C", as indicated by the collected information stored in the database 110, to generate and/or create a visualization of a logical boundary (or "geo-fence") defined by the relative positions of the devices, independent of the physical space in which the devices are located. In particular, as shown in FIG. 1, logical boundaries 109, 109', and 109" are generated based on the furthest-discovered ones of the devices 111A-111E, 111A'-111D', and/or 111A"-111C". The logical boundaries 109, 109', and 109" may, but need not, correspond to physical boundaries in which the devices 111A-111E, 111A'-111D', and/or 111A"-111C" are located.

Figure 5:
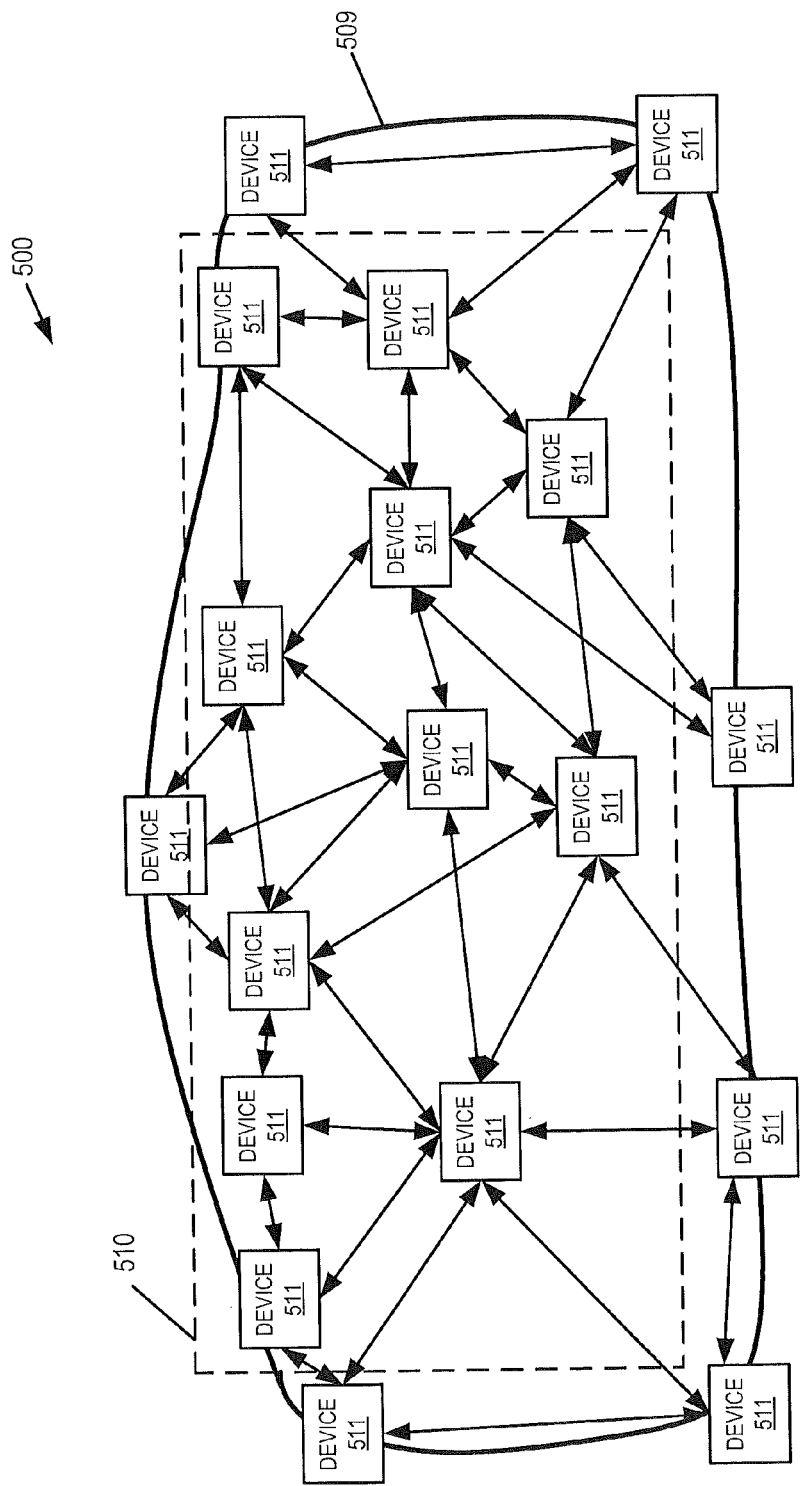
FIG. 5 is a block diagram that illustrates generation of a logical boundary or geo-fence based on relative proximities of electronic devices detected in accordance with embodiments described herein.

The server 105 may also detect and/or create a visualization as to movement of one or more of the devices 111A-111E, 111A'-111D', and/or 111A"-111C" within an environment, such as the office environment illustrated in FIG. 5. For instance, if ones of the devices 111N intermittently come into and move out of range of the devices 111A-111E, 111A'-111D', and/or 111A"-111C" (as determined for example, based on received signal strength), while the devices 111A-111E, 111A'-111D', and/or 111A"-111C" are constant in signal strength, the server 105 may determine that the ones of the devices 111N are moving relative to the devices 111A-111E, 111A'-111D', and/or 111A"-111C". The logical boundaries 109, 109', and 109" and/or movement of devices may be created and/or detected independent of or without the use of location-based or GPS information. In addition, if even one of the devices 111A-111E, 111A'-111D', and/or 111A"-111C" provides GPS information, the server 105 can determine an approximate location of the other proximately-located devices. The server 105 may also generate user profiles with respect to a detected device, indicating (for example) how long a device is in the office area and/or when the device leaves the office area. If a device travels to another monitored office location (for example, from boundary 109 to boundary 109'), similar authentication, risk, and/or access control protections can be provided by the central server 105, which may be aware that the device is moving across different office locations based on the crowdsourced information from proximately located devices.

While described above primarily with reference to enterprise uses, crowd-sourced device information in accordance with embodiments described herein can be extended to consumer based apps and/or to the Internet-of-Things (IOT). For example, a bank may provide an app to its customers via app store 115, which may be downloaded to their mobile devices 111A-111E, 111A'-111D', and/or 111A"-111C". If the user base is sufficiently large, then a central bank server 105 can perform device proximity detection as described herein to evaluate a risk of respective transactions with the devices 111A-111E, 111A'-111D', and/or 111A"-111C" based on the techniques described above. In particular, detecting known or identifiable devices proximately-located to a transacting device would provide a greater level of confidence as to the location of and/or authorization for the transaction. More generally, although FIG. 1 illustrates an example of a computing environment 100, it will be understood that embodiments described herein are not limited to such a configuration or usage, but are intended to encompass any configuration or usage capable of carrying out the operations described herein.

Figure 2:
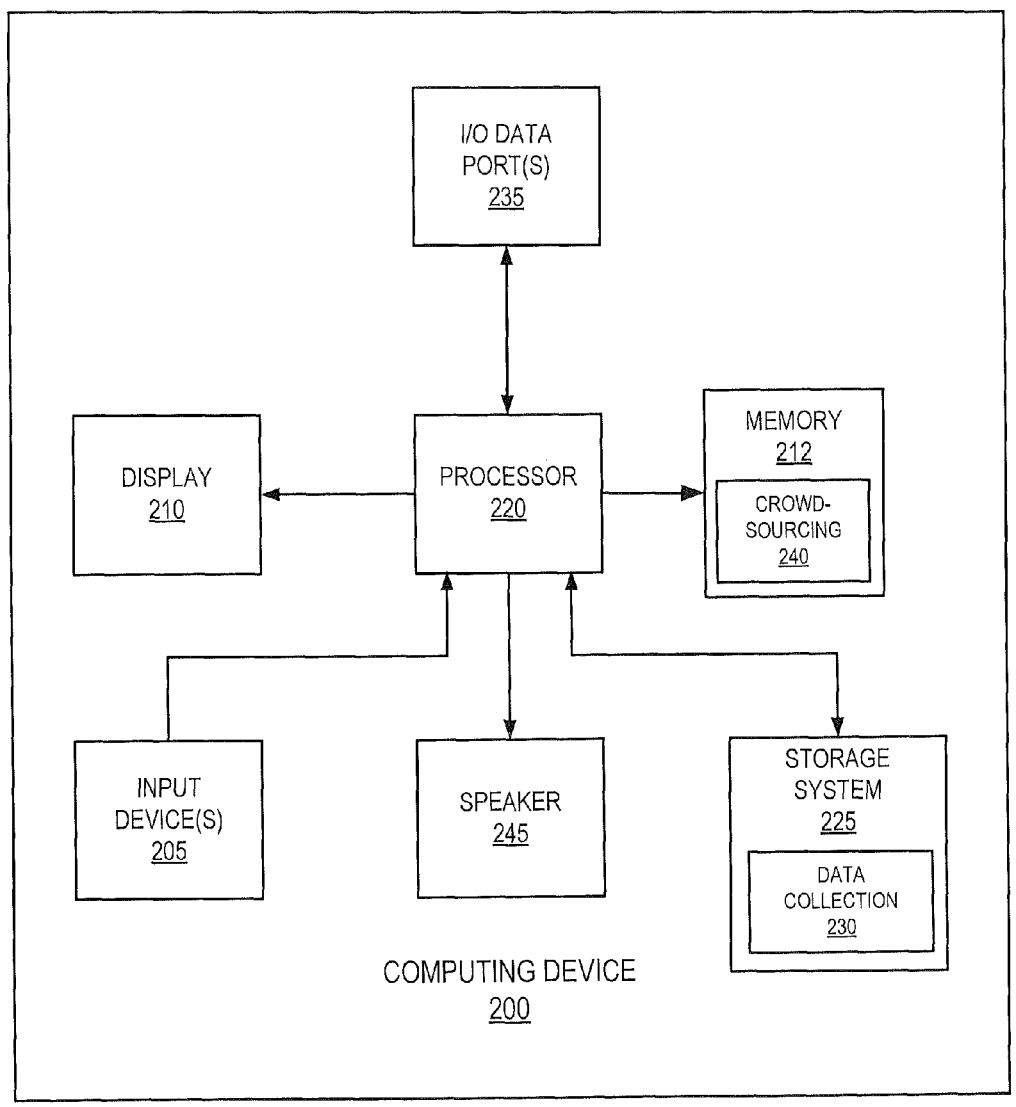
FIG. 2 is a block diagram of a computing device for detecting electronic devices in accordance with embodiments described herein.

FIG. 2 illustrates an example computing device 200 in accordance with some embodiments described herein. The device 200 may be used, for example, to implement the server 105 in the system 100 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 215 that communicate with one or more processors 220 (generally referred to herein as "a processor"). The computing device 200 may further include a storage system 225, a speaker 245, and I/O data port(s) 235 that also communicate with the processor 220. The memory 212 may include a crowdsourcing module 240 installed thereon. The crowdsourcing module 240 may be configured to receive information about one or more particular user equipment devices (also referred to herein as "first" or "target" devices) from one or more other user equipment devices (also referred to herein as "second" or "source" devices) that are nearby, surrounding, or otherwise within range of a wireless transceiver of the particular user equipment device, for example, via an application installed on the other user equipment device(s). The crowdsourcing module 240 may further detect or determine presence, identity, proximity, authentication, location, movement, level of trust, and/or level of risk of the target user equipment device(s) based on the information received from the source user equipment device(s), as described herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may include a data collection library 240 storing the crowdsourced information about the target device(s) received from the source device(s), which may be accessed by the crowdsourcing module 230 to detect, identify, and/or track the target device(s), as described herein. Although illustrated in separate blocks, the memory 212 and the storage system 225 may be implemented by a same storage medium in some embodiments.

The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

Figure 3:
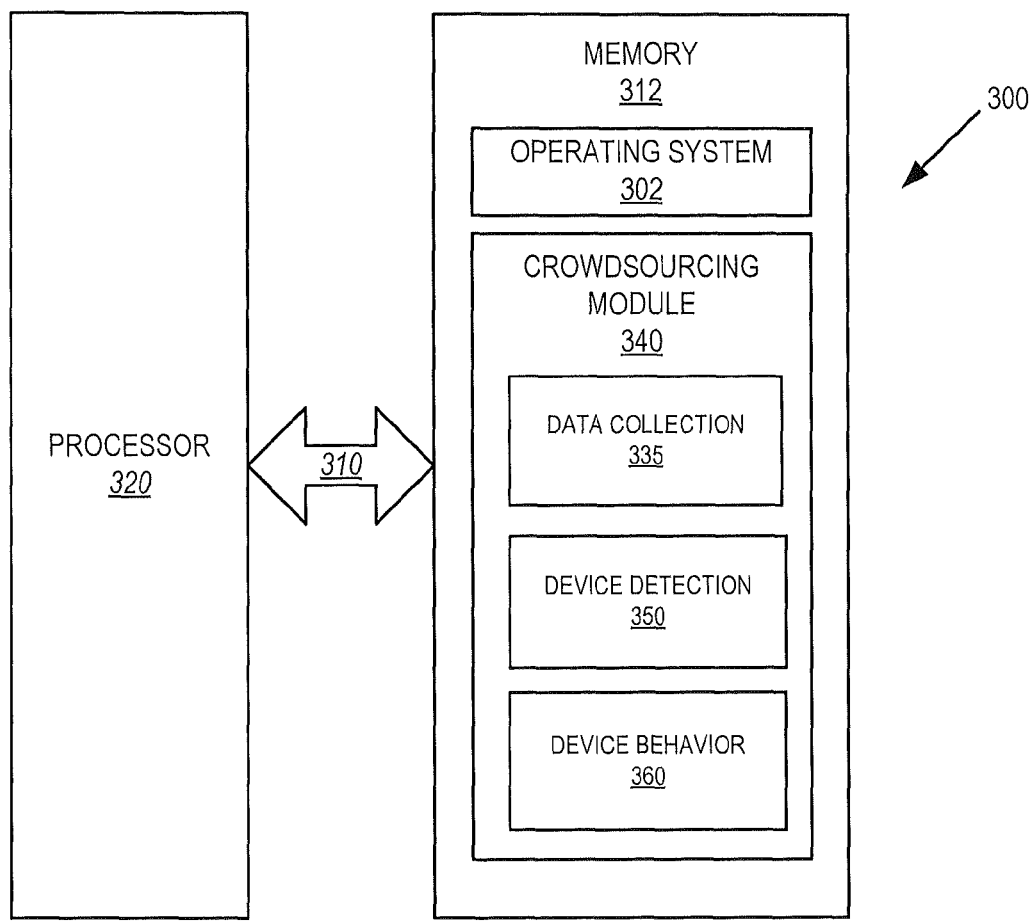
FIG. 3 is a block diagram that illustrates a software/hardware architecture of a server for detecting electronic devices in accordance with embodiments described herein.

FIG. 3 illustrates a software/hardware architecture 300 for crowdsourcing-based detection of electronic devices in accordance with further embodiments described herein. In particular, FIG. 3 illustrates a processor 320 and memory 312 that may be used in computing devices or other data processing systems, such as the server 105 of FIG. 1 and/or the computing device 200 of FIG. 2. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments described herein. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and a resource management block 330. The operating system 302 generally controls the operation of the computing device or data processing system. For example, the operating system 302 may manage software and/or hardware resources and may coordinate execution of programs by the processor 320 in providing the functionality described herein.

In particular, the crowdsourcing module 340 is configured to carry out some or all of the functionality of the server 105 of FIG. 1. As such, the crowdsourcing module 340 includes a data collection function or module 335, device detection function or module 350, and a device analysis function or module 360. The functionality of these modules 335, 350, and 360 will be described with reference to the flowchart of FIG. 4, which illustrates operations for detecting, identifying, and tracking electronic devices in accordance with embodiments described herein. The operations described with reference to FIG. 4 may be performed by the hardware/software architecture of FIG. 3, the computing device 200 of FIG. 2, the server of FIG. 1, and/or elements thereof.

Figure 4:
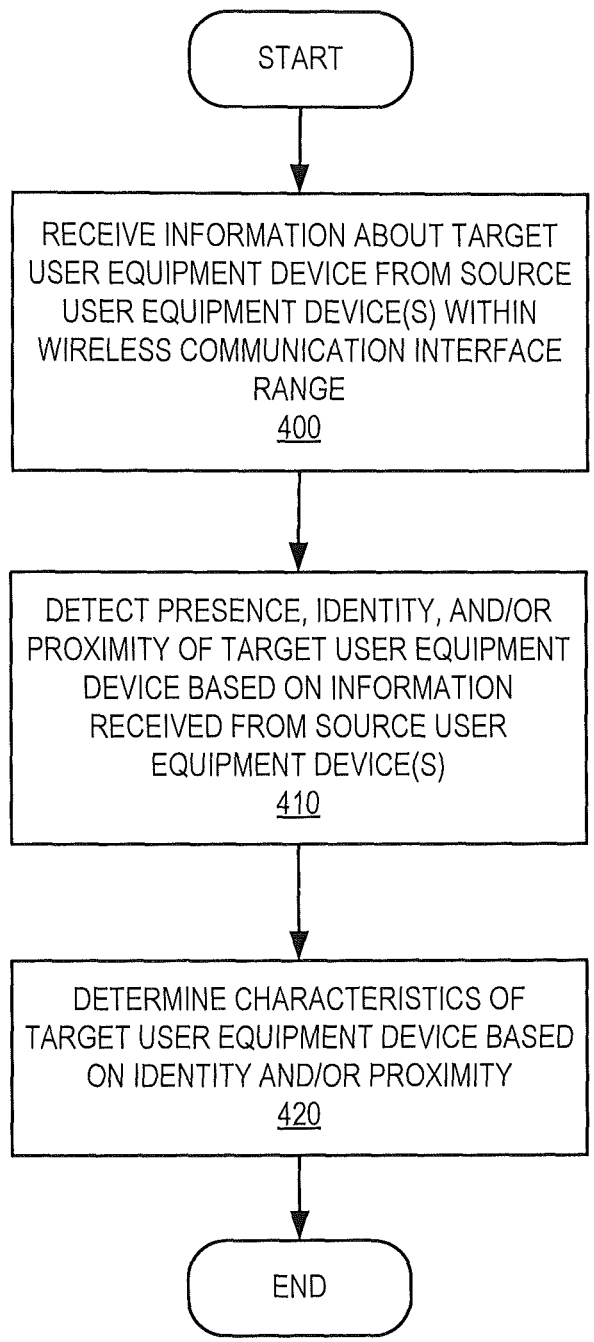
FIG. 4 is a flowchart illustrating methods for detecting electronic devices in accordance with embodiments described herein.

Referring now to FIG. 4, operations begin at Block 400 where information about a target user equipment device is received from at least one source user equipment device within range of a wireless communication interface of the target user equipment device. This crowdsourced information may include identification information that is inaccessible to an application installed on the target user equipment device, but is shared with surrounding devices via the wireless interface, such as a peer-to-peer, ad-hoc, and/or other decentralized communication interface. For example, the identification information may be address information (such as a Bluetooth and/or Wi-Fi MAC address) for the wireless interface of the target user equipment device, which is indirectly discoverable by the at least one source user equipment device via a Bluetooth and/or Wi-Fi interface. In other words, information about the target user equipment device is received indirectly (that is, from proximately-located source user equipment devices rather than from the target device itself), and passively (that is, without permission/authorization from or action by users of the source and/or target user equipment devices). The information about the target user equipment device is thus received independent of data originated from a beacon, wireless access point, or other centralized network infrastructure within the range of the wireless interface. The data collection module 335 of FIG. 3 may be configured to perform these and/or other operations as discussed above with reference to Block 400.

At Block 410, a presence, proximity, and/or identity of the target user equipment device relative to source user equipment device(s) is detected based on the information received from the source user equipment device(s). For example, the crowdsourced information received from the source devices may indicate address information and/or relative signal strength with respect to a particular target device, and the identity and/or distance/location of the target device relative to the source devices from which the information is received may be computed, for instance, by triangulation or other known computations. Additional information about the target user equipment device may also be received from a wireless access point or router (such as one or more of the routers 150, 150', 150" of FIG. 1) and/or from one or more applications executing on the target device, and this additional information may be correlated with the information about the target device received from the source devices to identify the target device. The device detection module 350 of FIG. 3 may be configured to perform these and/or other operations as discussed above with reference to Block 410.

At Block 420, characteristics and/or behavior of the target device is determined based on analysis of the crowdsourced information received from the surrounding devices, such as the detected identity and/or proximity. For example, a trust for a target user equipment device may be determined and/or the target device may be authenticated based on its proximity (and/or duration thereof) to one or more trusted electronic devices, as discussed above with reference to FIG. 1. Likewise, a level of risk for a transaction with the target device may be determined based on its proximity to the trusted device(s) and/or a duration of the proximity. Additional information (such as GPS or other location based information) may also be used such analysis. For example, based on previously obtained information, a location of the target device in a particular room of a building may be determined based on the proximity, and/or movement of the target device may be determined based on changes in the proximity. Provisioning of one or more services to the target device may likewise be authorized based on such determined behavior and/or characteristics thereof. For instance, based on the detected proximity, it may be determined that the target user equipment device is located in an unauthorized area, and thus, access to services and/or resources in the area (such as available hotspots) may be denied to the target device. Furthermore, as described in greater detail below with reference to FIG. 5, a logical boundary/geo-fence may be generated based on the proximities of multiple target devices relative to one or more source devices, independent of GPS or location-based services. The device analysis module 360 of FIG. 3 may be configured to perform these and/or other operations as discussed above with reference to Block 420.

Although FIG. 3 illustrates example hardware/software architectures that may be used in a device, such as the computing device 200 of FIG. 2 and/or server 150 of FIG. 1, for crowdsourcing-based detection of electronic devices in accordance with some embodiments described herein, it will be understood that the present invention is not limited to such a configuration but is intended to encompass any configuration capable of carrying out operations described herein. Moreover, the functionality of the server 150 of FIG. 1, the computing device 200 of FIG. 2, and the hardware/software architecture of FIG. 3 may be implemented as a single processor system, a multi-processor system, a processing system with one or more cores, a distributed processing system, or even a network of stand-alone computer systems, in accordance with various embodiments.

Computer program code for carrying out the operations discussed above with respect to FIGS. 1-4 may be written in a high-level programming language, such as COBOL, Python, Java, C, and/or C++, for development convenience. In addition, computer program code for carrying out operations described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

FIG. 5 illustrates an operating environment 500 according to embodiments described herein in which a logical boundary or geo-fence may be generated based on information collected from a plurality of user equipment devices 511. In particular, FIG. 5 illustrates a physical office space or area 510, inside or outside of which employees (each carrying a user equipment device 511) are located. At least some of the devices 511 include an installed application that is configured to communicate with a server, such as the crowdsource detection server 105 of FIG. 1. For example, the application may be an enterprise application that may be downloaded by the device(s) 511 from an enterprise app store, such as the app store 115 illustrated in FIG. 1, and may be configured to communicate with the server via a network interface or other available intranet/internet connection.

Additionally, one or more of the devices 511 may be "known" to the server, for example, in terms of identification and/or location, by means other than an application (e.g., an enterprise app) installed on the device 511. For instance, in an enterprise environment, a device 511 may be known in situations where the device 511 is issued to a particular user by the enterprise, and/or by information obtained from an Enterprise App store or other App store (from which the enterprise application was downloaded). Typically non-mobile devices (such as desktop or even laptop computers) can also be configured to download apps for communication with the server from the app store, but this may not necessary as the surrounding mobile devices can detect and identify such devices, as described herein.

As shown in FIG. 5, proximately-located ones of the devices 511 (that is, ones of the devices 511 within wireless transceiver range of each other) may detect or otherwise discover and communicate with each other via respective wireless communication interfaces. In particular, the arrows shown in FIG. 5 may illustrate Bluetooth®, Wi-Fi, and/or near-field communication (NFC) between proximately-located devices 511. Bluetooth® as used herein can refer to 'classic" Bluetooth® or Bluetooth® Low Energy (LE). The user equipment devices 511 in the office area 510 may be mobile or stationary devices, including (but not limited to) smartphones, tablets, laptop computers, desktop, computers, and/or smart appliances. Such devices may be Bluetooth- and/or Wi-Fi-capable, and can act as a transmitter as well as a receiver.

As described above, the devices 511 may relay or forward information discovered about each other (via peer-to-peer communications, shown by the arrows in FIG. 5) to a server, such as the server 105 of FIG. 1. In particular, ones of the devices 511 may discover address information (for example, a MAC address) and/or received signal strengths of surrounding ones of the devices 511, and may forward the discovered information to the server. Based on the information indicating addressing and/or signal strengths received from multiple source devices 511, a relative distance of a particular target device 511 can be determined. For example, relative locations of the devices 511 may be determined by triangulation or other known computations, based on the signal strengths of a particular target device 511 received at multiple source devices 511, where signal strength may be indicated in units of decibels (dB). A logical boundary/geo-fence 509 can thereby be computed by the server based on the relative locations of the furthest discovered ones of the user equipment devices 511, as determined from the crowdsourced information received from the source devices 511. Note that the logical boundary 509 generated by the server need not correspond to the physical boundary of the office area 510, and can be computed independent of location-based information (such as GPS information that may be provided by respective GPS transceivers in one or more of the devices 511) or in conjunction with previously-available identification and/or location information about ones of the devices 511. In addition, the server may correlate the logical boundary 509 with the physical boundary 510 of the office area (for instance, as determined from an accessible building schematic) to determine which of the devices are in which room of the office area.

Although illustrated in FIG. 5 with reference to mobile devices in an office environment, it will be understood that the present invention is not limited to such a configuration but is intended to encompass any configuration capable of carrying out operations described herein. For example, in some embodiments, the electronic devices 511 may be "things" that communicate in accordance with the internet-of-things.

Figure 6:
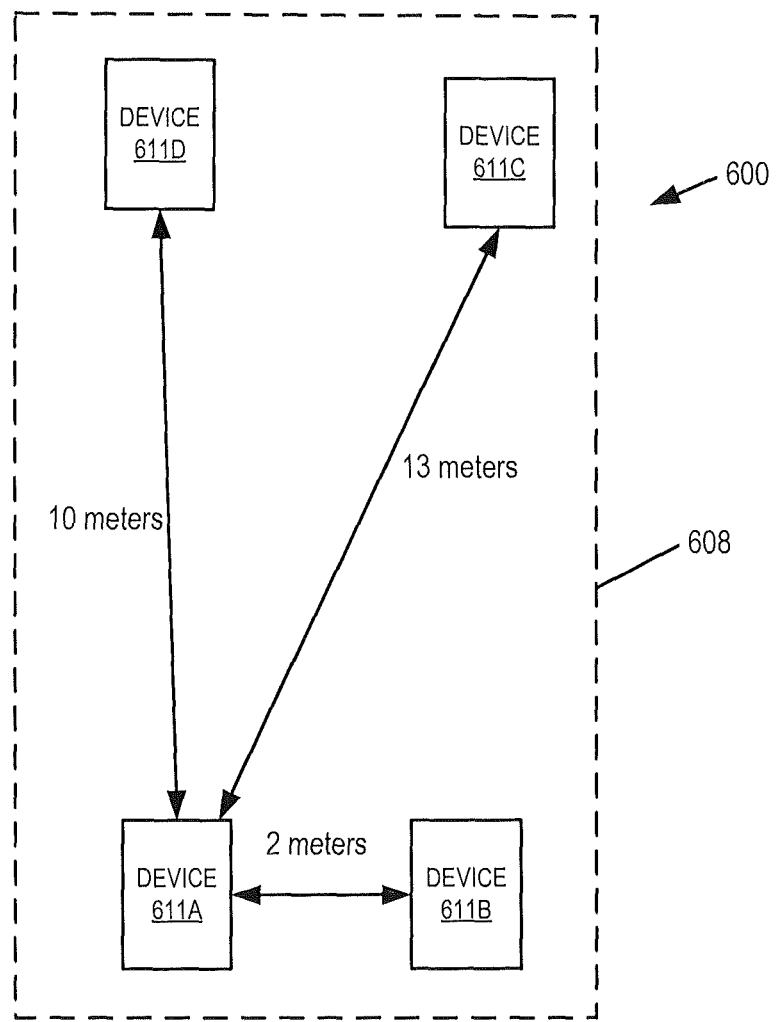
FIG. 6 is a block diagram that illustrates various functionality that may be provided based on the distance/proximity between user equipment devices in accordance with embodiments described herein.

FIG. 6 illustrates an operating environment 600 according to embodiments described herein in which the distance/proximity between user equipment devices can be used by a server (such as the server 105 of FIG. 1) to provide various functionality. For example, as shown in FIG. 6, based on the relative proximities of user equipment devices 611A-611D (indicated by the crowdsourced information provided by the devices 611A-611D about each other), spatial relationships with co-located mobile devices can be determined. As such, a visual representation 608 of the identities, relative positions, and/or distances of the devices in a closed environment can be generated by the server and transmitted to the devices 611A-611D for display. For instance, such a visual representation may be used to provide lost-and-found functionality. Also, based on the relative proximities of the devices 611A-611D, a rule-based message and/or file transfer functionality can be implemented by the server. For example, a broadcast message (or particular file) may be selectively transmitted from the server to device 611B (rather than to devices 611C and 6111D) based on its proximity within a predetermined distance (in this example, 2 meters) of a particular device 611A. In addition, for gaming applications that support multi-player games, the distance between two devices may be used in calculating velocity, speed, and/or strategy. For instance, the respective distances between a stationary console (such as a Wii® or Xbox®) and two or more mobile electronic devices (any of which may crowdsource information to the server) may be used (by the server or console) to render different frames for the users of the mobile electronic devices (for example, in a war based game).

Figures 7A, 7B:
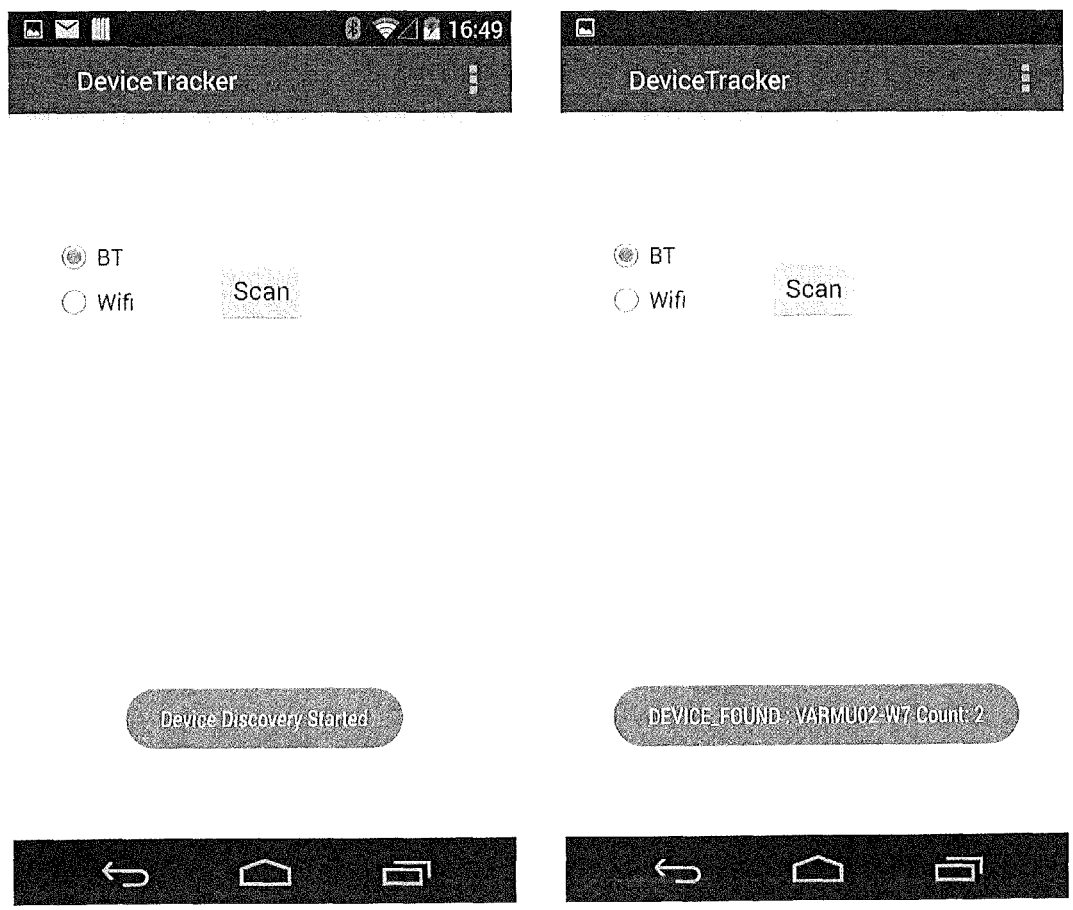
FIGS. 7A-7B are block diagrams illustrating an example user interface for detecting electronic devices in accordance with embodiments described herein.

Further embodiments described herein will now be discussed with reference to the specific examples below. FIGS. 7A and 7B illustrate a user interface for a downloadable software application including crowdsourcing functionality as described herein. The application may be downloaded onto user equipment devices as described herein, such as the devices 111A-111E, 111A'-111D', 111A"-111C", and/or 111N of FIG. 1, from an environment for hosting apps, such as the app store 115 of FIG. 1. Specific examples are described below with reference to device detection, identification, and tracking via a downloadable app (illustrated in FIGS. 7A-7B as a device tracker app) for mobile Android® and iOS® devices, which is configured to provide information about proximately-located devices to a central server, such as the server 105 of FIG. 1. In particular, FIG. 7A illustrates initiation of device discovery (via Bluetooth) interface by the device tracker app installed on a source consumer electronic device, while FIG. 7B illustrates successful discovery of information about a target consumer electronic device, which is forwarded to a crowdsource-based detection server (such as the server 105 of FIG. 1).

Samples of data collected and forwarded to the crowdsource-based detection server in accordance with embodiments described herein are illustrated in the examples below. In particular, Examples 1 and 2 list sample data collected on an Android device, while Examples 3 and 4 list sample data collected on an iOS device, via Bluetooth and Wi-Fi interfaces, respectively:

Example 1: Device Identification Using Bluetooth

{"MY_DEVICE_NAME":"GTI8160","MY_DEVICE_ADDRESS": "0D:15:20:44:AB:67"}
{"DEVICE_DISCOVERY_STARTED":"19700101T000000Asia\/Calcutta(0,0,0,-1,-19800)"}
{"Name":"tek's iMac","Connection-status":"NOTCONNECTED","Signal-strength":"-89dBm", "Device":"DETECTED","Pair-status":"UNPAIRED", "Type":"COMPUTER"," Address":"00:2A:D2:9B:E2:EE"}
{"Connection-status":"NOTCONNECTED","Signal-strength":"-86dBm","Device":"DETECTED","Pair-status":"UNPAIRED", "Type":"PHONE", "Address":"D4:33:FA:FF:01:E6"}
{"DEVICE_DISCOVERY_FINISHED":"19700101T000000Asia\/Calcutta(0,0,0,-1,-19800)"}

Example 2: Device Identification Using Wi-Fi

```
{"AccessPointList":"{MY_DEVICE_NAME=Samsung GT-I8160,
MY_MAC_ADDRESS=0D:15:20:44:AB:68, MyAccessPoint=Tek,
BSSID=76:45:1e:a8:e6:ae, HiddenSSID=null,
MacAddress=0D:15:20:44:AB:68, IpAddress=null, NetworkId=null,
RSSI=-55 dBm, LinkSpeed=null, ACCESS_POINTS=[\"SSID: Tek,
BSSID: 76:45:1e:a8:e6:ae, capabilities: [WPA-PSK-
TKIP+CCMP][WPA2-PSK-TKIP+CCMP][WPS], level: -54, frequency:
2437, primaryDev: 0, status: 0\",\"SSID: connectme, BSSID:
98:cf:22:41:e6:1e, capabilities: [WPA-PSK-TKIP][WPS], level: -
85, frequency: 2437, primaryDev: 0, status: 0\",\"SSID: Nest,
BSSID: 00:1f:20:41:bc:4b, capabilities: [WEP], level: -85,
frequency: 2412, primaryDev: 0, status: 0]}"}
```

Example 3: Device Identification Using Bluetooth Private API Framework

```
{"Name":"GT-I8160","Address":"00:2A:D2:9B:E2:EE",
"Type":"PHONE"}
```

Example 4: Device Identification Using Wi-Fi

```
{"AccessPointList":"BSSID = "e6:a3:b7:b6:8b:11"SSID =
PublicAP"}
```

To achieve crowd-sourced trust in accordance with embodiments described herein for smartphone devices, the mobile device app should be configured to turn on Bluetooth and make the device visible without requiring user permission each time. While this may be possible for Android-based devices, iOS-based devices (by default) may not expose Public APIs to turn on/off the Bluetooth of the device. Using Private APIs (APIs which are internal to iOS and not exposed publicly), it may be possible to turn on/off the Bluetooth without permission of the user.

In addition, Bluetooth (and Wi-Fi) discovery should be possible even with the app running in the background. While this may be possible for Android-based devices, Bluetooth discovery in the background may not be possible for iOS-based devices by default, since the app may go into suspended mode. However, the app executing on the Android-based devices can detect and identify surrounding iOS devices; for example, the Name and MAC address of the iOS devices can be obtained from one or more proximately-located Android-based devices. Likewise, as the devices are Wi-Fi capable, the app should be configured to enable Wi-Fi at least as a receiver only (unless personal hotspot functionality is turned on, which means the transmitter should also be enabled).

In some embodiments, the app may be configured to obtain Bluetooth and/or Wi-Fi interface MAC addresses of the device on which the app is installed. While this may be possible for Android-based devices, for iOS-based devices such addresses may not be available for access (by either the device on which the app is installed or the devices detected by the installed app), as only Private APIs may have access to this information. Devices that do not include the installed app can be discovered by other devices if Bluetooth is kept on until the message "Now discoverable" appears. BLE, however, may involve some restrictions, particularly as BLE may require user's permission.

Also, since there is no pairing involved, there is no database information about the connected devices. In some embodiments, the app may be configured to obtain/discover information about neighboring devices via NFC (Near Field Communication), albeit at more restricted distances; however, NFC is not currently supported for iOS devices. It will be understood that many of the above restrictions (for instance, as mentioned for iOS based devices) are not technical in nature. For example, Juno's Pulse VPN client on iOS devices can run in the background and may be available on an environment for hosting apps, even though it appears to use Private APIs. As such, some of the above restrictions may be overcome via appropriate partnerships/arrangements.

In a first example of detection, identification, and tracking of user equipment devices based on crowdsourced information in accordance with embodiments described herein, the target user equipment device is a laptop or desktop computer, such as a PC. For laptops and PCs, Wi-Fi and Bluetooth transceivers are typically turned on by default. As such, the laptop/PC need not have an app installed for communication with a crowdsource-based detection server; rather, other proximately-located user equipment devices on which such an app is installed can discover nearby laptops or PCs and forward information thereabout to the server for detection, identification, and/or other analysis as described herein.

In a second example of detection, identification, and tracking of user equipment devices based on crowdsourced information in accordance with embodiments described herein, the target user equipment device is an Android-based device having a Bluetooth/Wi-Fi/NFC-capable transceiver. In this example, an app configured to transmit information to a crowdsource-based detection server is installed on the target user equipment device. When the app is used, it can check its proximity (or "neighborhood") for other Bluetooth/Wi-Fi/NFC-capable devices and/or Wi-Fi hotspots, including smartphones, laptops and/or other user equipment devices (including but not limited to Apple devices, Windows devices, Blackberry devices, etc.). This check can be performed on a regular basis (for instance, every 5 minutes), and may be synchronized for all Android devices on which the app is installed. The check can be performed even if the app is running in the background. If Bluetooth is off, it can be turned on by the app (without requiring user permission) and then turned off after a predetermined time (for instance, after, 1 minute). If the visibility of the device is turned off, it can likewise be turned on by the app (without requiring user permission) and then turned off after a predetermined time (for instance, after, 1 minute). These actions can be time-synchronized by the app, and/or be managed by the centralized server. The detection can be based on Bluetooth Low Energy (BLE) (which has lower range) or classic Bluetooth.

Still referring to the second example, the characteristics or other device identification information detected (depending on device type—mobile, laptop, router, etc.) may include: UUID (universal unique identifier) of the target/discovered devices (if applicable); the Bluetooth interface MAC address of the discovered devices; the Wi-Fi interface MAC address, name, and/or signal strength of the access point(s) and/or hotspots in the vicinity; the Wi-Fi interface MAC address of the source device in which the app is running (which, in some embodiments, can be derived by subtracting 1 from the Bluetooth interface MAC address, either on the app or on the server side); device type of the discovered devices (for example, computer or phone, where tablets may be discovered as a computer); given names of the discovered devices; name of the source device on which the app is installed; other available data for the source device, such as Advertiser ID, Vendor ID, etc.; processor/CPU characteristics of the source device; IP Address of the source device; list of devices with which the source device has already paired (but not connected), using Bluetooth or BLE; and/or list of devices to which the source device is currently connected, using Bluetooth or BLE.

In a third example of detection, identification, and tracking of user equipment devices based on crowdsourced information in accordance with embodiments described herein, the target user equipment device is an iOS-based device having a Bluetooth/Wi-Fi transceiver (but in which NFC is not supported). iOS may provide restrictions on what an installed app can do; thus, while the following may possibly be achieved using Apple Private APIs (restricting it to the Enterprise App Store only), it may not be published as such to the Apple App Store®, because of the usage of iOS Private API framework. However, as noted, these are business restrictions, rather than technical limitations.

Still referring to the third example, the characteristics or other device identification information detected (depending on device type—mobile, laptop, router, etc.) may include: the UUID of discovered devices; the signal strength of the discovered devices indicating rough distance; the name of discovered devices; the UUID of the source device, if applicable; the name of the source device; Wi-Fi hot spots seen by the source device (including, for instance, name, signal strength, etc.); details of the current Wi-Fi network to which the source device is connected, using Private APIs; name of the source device on which the app is installed; other available data for the source device, such as Advertiser ID, Vendor ID, etc.; processor/CPU characteristics of the source device; a count/number of already paired but unconnected Bluetooth/BLE devices; and/or a count/number of already connected Bluetooth devices. Note that IP Address, Wi-Fi interface address, and/or Bluetooth MAC interface address may not typically be accessible, even by Private APIs, on iOS-based devices in which the app is installed.

Accordingly, in embodiments described herein, crowdsourced-based techniques may be implemented to collect information about one or more target devices from at least one source device. The information about the target device(s) received from the source device(s) may indicate presence, identity, and/or proximity of the target device(s). The crowdsource-based server may use such indirectly received information to determine, for example: wireless interface MAC address(es) of the target device(s); location(s) of the target device(s) relative to other known or unknown devices; identification of the target device(s); known device proximity based geo-fencing without using physical device location techniques; crowd-sourced authentication, authorization and audit of the target device(s) with respect to online resource and/or mobile app access; identification and tracking of visiting "unknown" or intruder target device(s) in the proximity of the source device(s) and quarantining or denying of the target device(s) from resource access; identification of unauthorized personnel in restricted areas based on the detected presence of the target device(s); centralized viewing, tracking and visualization of how the target device(s) are moving around in a given location, as well as time spent in particular area(s); which of the target device(s) are moving with respect to other stationary and/or moving devices; access rights to services based on devices present in proximity of the target device(s); and/or location of people during emergencies, based on the presence of the target device(s). In particular embodiments, the server may receive information about devices accessing protected resources, and may provide risk mitigation for devices being used in an enterprise, internet and/or IOT situations.

Embodiments described herein may differ from some conventional crowdsourcing techniques in several aspects. For example, embodiments described herein allow for passive device identification and tracking, independent of user action/permission, and without requiring pairing/networking/data transfer between devices. Also, embodiments described herein provide information to a centralized server for analysis, without need for collection or permanent storage of information on a particular device; rather, surrounding devices detect information about each other and forward the detected information to the server. Moreover, devices can be detected even if the devices do not include an installed application for communication with the centralized server, so long as at least one proximately-located source device includes the application. Thus, presence, identity, and/or proximity may be determined by embodiments described herein based solely on peer-to-peer detection, and independent of information originated from or beacons and/or other centralized network infrastructure.

The flowchart and block diagrams in the Figures illustrate the architecture, functionality, and operation of possible implementations of systems, methods and computer program products according to various aspects described herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of detecting electronic devices, the method comprising:
receiving, at a server, information about a first user equipment device that is transmitted from a second user equipment device within range of a short range wireless communication interface of the first user equipment device, wherein the information is authorizable by the first user equipment device and is discoverable by the second user equipment device via the short range wireless communication interface, wherein the first and second user equipment devices are peer devices that are distinct from network infrastructure, wherein the information comprises device identification information for the first user equipment device that uniquely identifies the first user equipment device, and wherein the short range wireless communication interface is a decentralized wireless communication interface;
detecting, at the server, a presence of the first user equipment device based on the information comprising the device identification information for the first user equipment device received from the second user equipment device and independent of information received from the first user equipment device, wherein the information received from the second user equipment device about the first user equipment device does not pertain to the second user equipment device and is received from the second user equipment device independent of authorization by the first user equipment device;
identifying, at the server, the first user equipment device based on the information received from the second user equipment device, wherein the device identification information is inaccessible to an application installed on the first user equipment device; and
performing, at the server, an action affecting the first user equipment device based on the detected presence of the first user equipment device, wherein the action comprises tracking the first user equipment device,
wherein the receiving, the detecting, the identifying, and the performing comprise operations performed by a processor of the server.

2. The method of claim 1, wherein the device identification information comprises a Medium Access Control (MAC) address for the wireless communication interface of the first user equipment device, and wherein the MAC address is received by the second user equipment device without pairing between the first and second user equipment devices.

3. The method of claim 2, wherein identifying the first user equipment device comprises:
receiving, at the server, an application identifier for the application installed on the first user equipment device; and
correlating, at the server, the application identifier with the MAC address for the wireless communication interface of the first user equipment device received from the second user equipment device.

4. The method of claim 2, wherein identifying the first user equipment device comprises:
receiving, at the server, additional information about the first user equipment device via the network infrastructure; and
correlating, at the server, the additional information with the MAC address for the wireless communication interface of the first user equipment device received from the second user equipment device.

5. The method of claim 1, further comprising:
determining, at the server, a proximity of the first user equipment device to the second user equipment device based on the information received from the second user equipment device,
wherein the information from the second user equipment device indicates a received signal strength of the wireless communication interface of the first user equipment device at the second user equipment device.

6. The method of claim 5, further comprising:
detecting, at the server, a presence of a trusted electronic device within the proximity; and
determining, at the server, a trust for the first user equipment device based on the presence of the trusted electronic device within the proximity.

7. The method of claim 6, further comprising:
authenticating, at the server, the first user equipment device based on the presence of the trusted electronic device within the proximity and independent of authentication information received from the first user equipment device.

8. The method of claim 6, further comprising:
controlling, at the server, access to a resource by the first user equipment device access based on the presence of the trusted electronic device within the proximity.

9. The method of claim 6, further comprising:
assigning, at the server, a level of risk to a transaction with the first user equipment device based on the presence of the trusted electronic device within the proximity.

10. The method of claim 5, wherein the second user equipment device comprises one of a plurality of user equipment devices from which respective information about the first user equipment device is received, and further comprising:
determining, at the server, a relative location of the first user equipment device to the second user equipment device indicating a spatial relationship therebetween based on the respective information received from the plurality of user equipment devices.

11. The method of claim 10, further comprising:
detecting, at the server, the presence of first user equipment device in an unauthorized area based on the relative location.

12. The method of claim 10, further comprising:
generating, at the server, a logical boundary defined by the relative location of the first user equipment device to the second user equipment device.

13. The method of claim 5, further comprising:
determining movement of the first user equipment device relative to the second user equipment device based on changes in the proximity.

14. The method of claim 1, wherein the device identification information for the first user equipment device comprises a Medium Access Control (MAC) address for the first user equipment device.

15. An apparatus comprising:
processor circuitry; and
memory circuitry coupled to the processor circuitry and comprising computer readable program code stored therein that, when executed by the processor circuitry, causes the processor circuitry to perform operations comprising:

receiving information about a first user equipment device that is transmitted from a second user equipment device within range of a short range wireless communication interface of the first user equipment device, wherein the information is authorizable by the first user equipment device and is discoverable by the second user equipment device via the short range wireless communication interface, wherein the first and second user equipment devices are peer devices that are distinct from network infrastructure, wherein the information comprises device identification information for the first user equipment device that uniquely identifies the first user equipment device, and wherein the short range wireless communication interface is a decentralized wireless communication interface;

detecting a presence of the first user equipment device based on the information comprising the device identification information for the first user equipment device received from the second user equipment device and independent of information received from the first user equipment device, wherein the information received from the second user equipment device about the first user equipment device does not pertain to the second user equipment device and is received from the second user equipment device independent of authorization by the first user equipment device;

identifying the first user equipment device based on the information received from the second user equipment device, wherein the device identification information is inaccessible to an application installed on the first user equipment device; and performing an action affecting the first user equipment device based on the detected presence of the first user equipment device, wherein the action comprises tracking the first user equipment.

16. The apparatus of claim 15, wherein the device identification information is received by the second user equipment device without pairing between the first and second user equipment devices.

17. The apparatus of claim 15, wherein, when executed by the processor circuitry, the computer readable program code causes the processor circuitry to perform further operations comprising:

determining a proximity of the first user equipment device to the second user equipment device based on the information received from the second user equipment device, wherein the information from the second user equipment device indicates a received signal strength of the wireless communication interface of the first user equipment device at the second user equipment device.

18. A computer program comprising:

a non-transitory computer readable storage medium comprising computer readable program code embodied in the medium that when executed by processor circuitry of a computer system causes the computer system to perform operations comprising:

receiving, at the computer system, information about a first user equipment device that is transmitted from a second user equipment device within range of a short range wireless communication interface of the first user equipment device, wherein the information is authorizable by the first user equipment device and is discoverable by the second user equipment device via the short range wireless communication interface, wherein the first and second user equipment devices are peer devices that are distinct from network infrastructure, wherein the information comprises device identification information for the first user equipment device that uniquely identifies the first user equipment device, and wherein the short range wireless communication interface is a decentralized wireless communication interface;

detecting, at the computer system, a presence of the first user equipment device based on the information received from the second user equipment device and independent of any information received from the first user equipment device, wherein the information received from the second user equipment device about the first user equipment device does not pertain to the second user equipment device and is received from the second user equipment device independent of authorization by the first user equipment device;

identifying, at the computer system, the first user equipment device based on the information received from the second user equipment device, wherein the device identification information is in accessible to an application installed on the first user equipment device; and performing, at the computer system, an action affecting the first user equipment device based on the detected presence of the first user equipment device, wherein the action comprises tracking the first user equipment.

* * * * *